US006447235B1

(12) United States Patent
Galeazzi et al.

(10) Patent No.: US 6,447,235 B1

(45) Date of Patent: Sep. 10, 2002

(54) WASTE COLLECTION DEVICE

(76) Inventors: Carlo Galeazzi, Via Roma, 144, 46049 Volta Mantovana (IT); Gianpietro Galeazzi, Via 1848, 37, 46049 Volta Mantovana (IT)

(*) Notice: Subject to any disclaimer, the term of this patent is extended or adjusted under 35 U.S.C. 154(b) by 0 days.

(21) Appl. No.: 09/550,495

(22) Filed: Apr. 17, 2000

(30) Foreign Application Priority Data

Apr. 21, 1999 (IT) ....................................... MN99A0018

(51) Int. Cl.$^{7}$ ............................ B65F 9/00; B65G 67/00

(52) U.S. Cl. .................... 414/398; 241/100; 241/101.5; 241/DIG. 38

(58) Field of Search ................................ 414/398, 399, 414/400; 241/100, DIG. 38, 101.5; B65F 3/04

(56) References Cited

U.S. PATENT DOCUMENTS 3,719,296 A * 3/1973 Larson, Jr. ............... 294/68.21

5,582,500 A * 12/1996 Morris ....................... 414/422

FOREIGN PATENT DOCUMENTS

| | | | |
|---|---|---|---|
| DE | 3531304 A1 * | 3/1987 | .......... B65D/90/62 |
| DE | 297 05 938 U | 7/1997 | |
| DE | 297 08 136 U | 1/1998 | |
| DE | 298 14 629 U | 11/1998 | |
| EP | 0 576 405 | 12/1993 | |
| EP | 0 708 039 | 4/1996 | |

* cited by examiner

*Primary Examiner*—Christopher P Ellis
*Assistant Examiner*—Kenneth W Bower
(74) *Attorney, Agent, or Firm*—Guido Modiano; Albert Josif; Daniel O'Byrne

(57) ABSTRACT

A waste collection device, comprising at least one container which is arranged in a pit in the presence of at least one pillar for waste insertion, elements being provided for emptying the container into a vehicle arranged at the rim of the pit.

8 Claims, 5 Drawing Sheets

WASTE COLLECTION DEVICE

BACKGROUND OF THE INVENTION

The present invention relates to a waste collection device. Conventional systems used to collect waste, particularly municipal waste, provide for the presence of containers placed in pits formed in the road paving, with at least one hollow pillar into which users place the bags of waste, which fall into the underlying container. The containers are provided with means for moving from a position in which they are retracted inside the pit to a position in which they protrude from the pit.

The container is periodically extracted completely from the pit in order to be emptied, and this fact requires an unoccupied area of considerable size proximate to the pit in order to make room for the extracted container and allow the maneuvers of the vehicle designed to receive the waste by emptying the container.

It is evident that maintaining a large unoccupied area adjacent to the pit is difficult and often impossible, and this fact limits the use of conventional devices.

SUMMARY OF THE INVENTION

The aim of the present invention is to provide a waste collection device which requires the allocation of a smaller unoccupied space adjacent to the pit.

This aim is achieved by a waste collection device, according to the present invention, characterized in that it comprises at least one container which is arranged in a pit in the presence of at least one pillar for waste insertion, provided with means suitable for emptying said container into a vehicle arranged at the rim of the pit.

BRIEF DESCRIPTION OF THE DRAWINGS

Further characteristics and advantages of the present invention will become apparent from the following detailed description of preferred but not exclusive embodiments of a waste collection device, according to the present invention, illustrated only by way of non-limitative example in the accompanying drawings, wherein.

DESCRIPTION OF THE PREFERRED EMBODIMENTS

Figure 1:
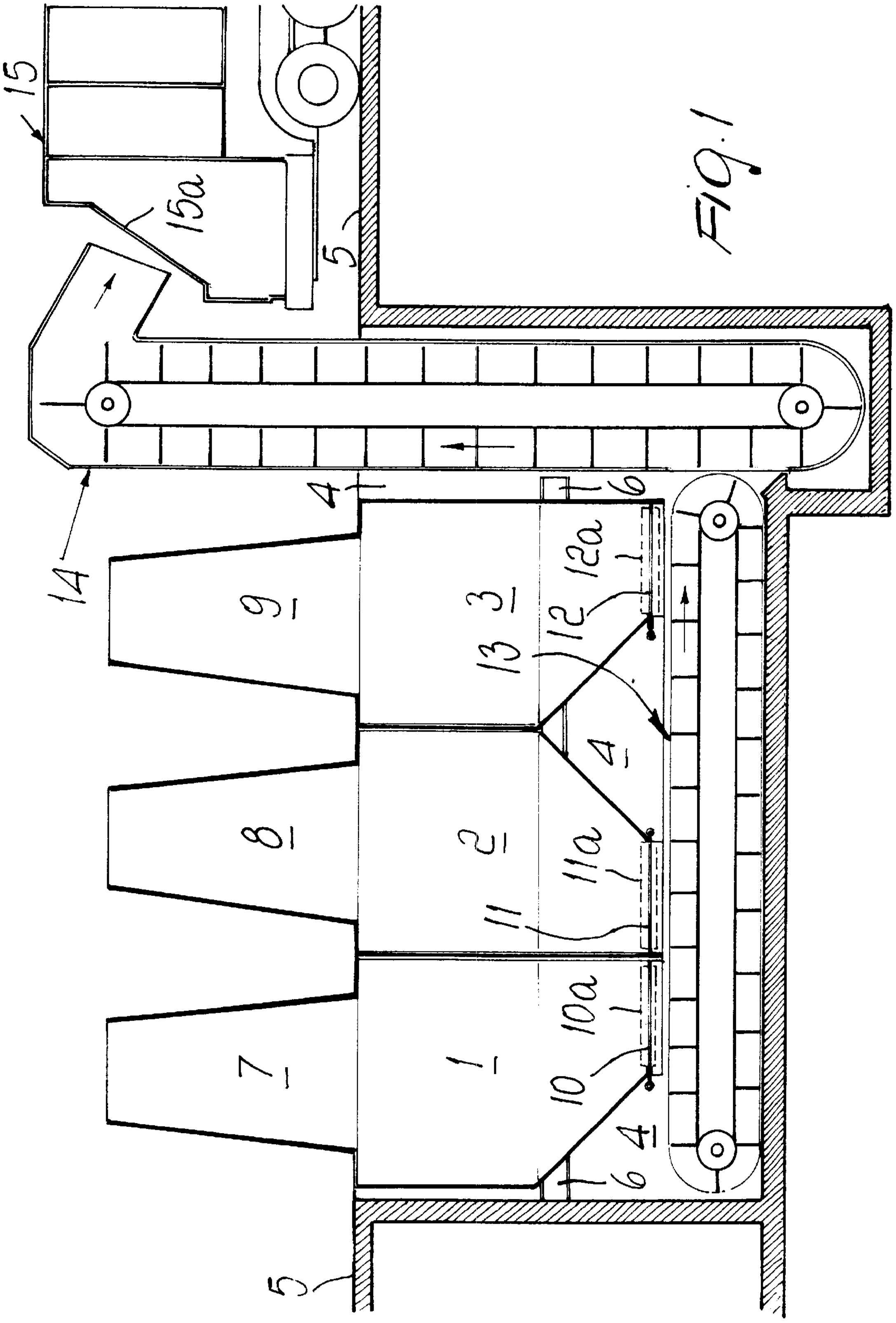
FIG. 1 is a schematic side view of the device of the present invention according to a first embodiment.

With reference to the above FIG. 1, the reference numerals 1, 2 and 3 designate three waste containers which are arranged in a pit 4 provided with surrounding paving, designated by the reference numeral 5.

The containers are rigidly coupled to the walls of the pit 4, since they are fixed to a beam 6 arranged transversely with respect to the pit 4, and each one is provided with a pillar 7, 8, 9 for inserting waste; their bottom 10, 11 and 12 can be opened by hydraulic cylinders 10*a*, 11*a*, 12*a*.

In the portion of space between the bottom of the pit 4 and the openable bottoms 10, 11 and 12 of the containers means for emptying the pit are provided, which comprise conveyance means and lifting means. The conveyance means comprise a conveyor belt, generally designated by the reference numeral 13, which conveys the waste that has fallen onto it from the containers 1, 2 and 3 due to the opening of their bottoms 10, 11 and 12 to the lifting means which comprise a bucket elevator, generally designated by the reference numeral 14. The elevator conveys the waste directly to a loading inlet 15*a* of a vehicle 15 positioned at the rim of the pit 4.

It should be observed that the above-described device and the embodiments considered hereafter are suitable to perform sorted waste collection simply by reserving each container to a type of waste and by emptying the individual containers one after the other.

Figure 2:
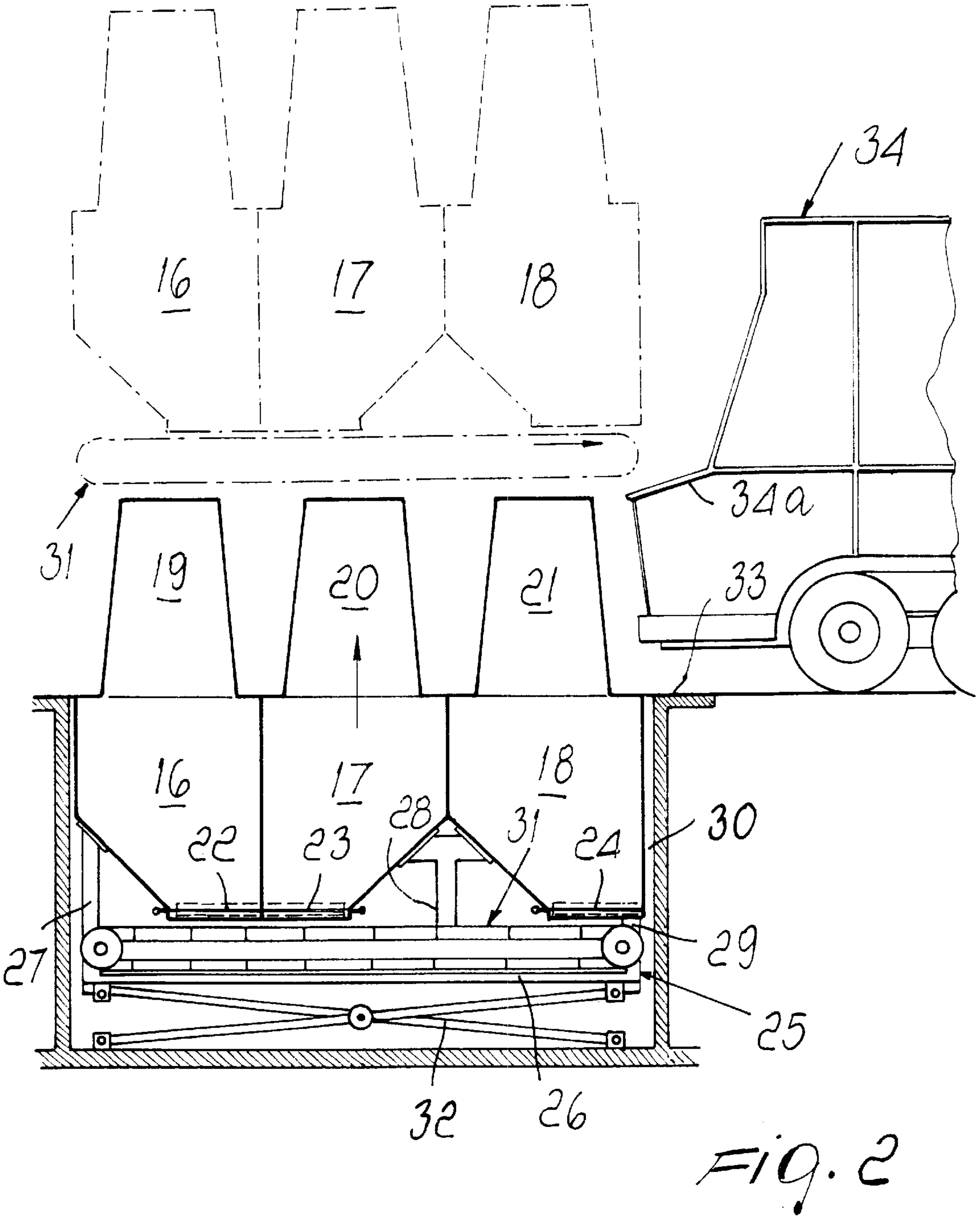
FIG. 2 is a schematic side view of the device of the present invention according to a second embodiment.

FIG. 2 illustrates a second embodiment which comprises the three containers 16, 17 and 18, each provided with a waste insertion pillar 19, 20, 21 and with an openable bottom 22, 23, 24.

The containers are rigidly coupled to a structure generally designated by the reference numeral 25, which comprises a platform 26 and posts 27, 28 and 29, is accommodated within a pit 30 and comprises the conveyor belt 31, which is located directly below the bottom of the containers.

The structure 25 is provided with means which comprise a pantograph 32 and are adapted to produce its vertical translatory motion between a lower stroke limit position, shown in solid lines in the figure, in which the plane that comprises the pillars 19, 20, 21 is located at the level of paving 33 that surrounds the pit 30, and an upper stroke limit position, shown in dot-and-dash lines in the figure, in which the conveyor belt 31 is at such a level as to allow the transfer, by gravity, of the waste received due to the opening of the bottoms of the containers directly into a loading inlet 34*a* of a truck 34 arranged at the rim of the pit.

Figure 3:
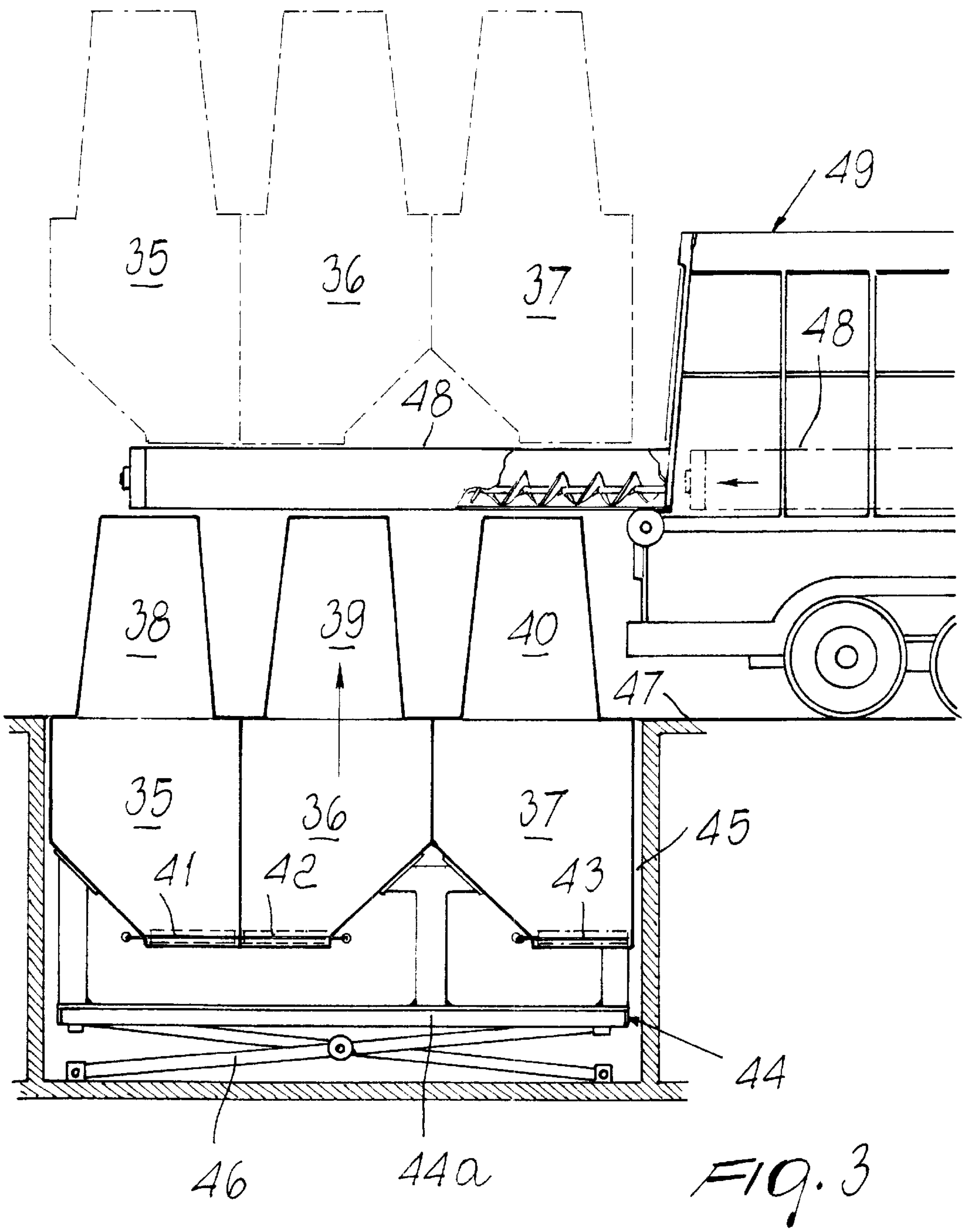
FIG. 3 is a schematic side view of the device of the present invention according to a third embodiment.

In the third embodiment shown in FIG. 3, three containers 35, 36 and 37 are provided with corresponding insertion pillars 38, 39, 40 and openable bottoms 41, 42 and 43 which are rigidly coupled to the structure generally designated by the reference numeral 44 which is accommodated within the pit 45 and provides for the presence of an unoccupied space between bottoms 41, 42, 43 of the containers and a platform 44*a* of the structure.

The structure 44 is provided with means which comprise a pantograph 46 and are suitable to produce its vertical translatory motion between a lower stroke limit position, shown in solid lines in the figure, in which the plane that comprises the pillars 38, 39, 40 lies at the level of paving 47 that surrounds the pit 45, and a upper stroke limit, shown in dot-and-dash lines in the figure, in which the unoccupied space lies at a level of a screw feeder 48, which is extracted from a truck 49 arranged at the rim of a pit 45 and is inserted in the above-cited space in order to receive the waste that falls from the containers 35, 36, 37 and convey it into said truck 49.

Figure 4:
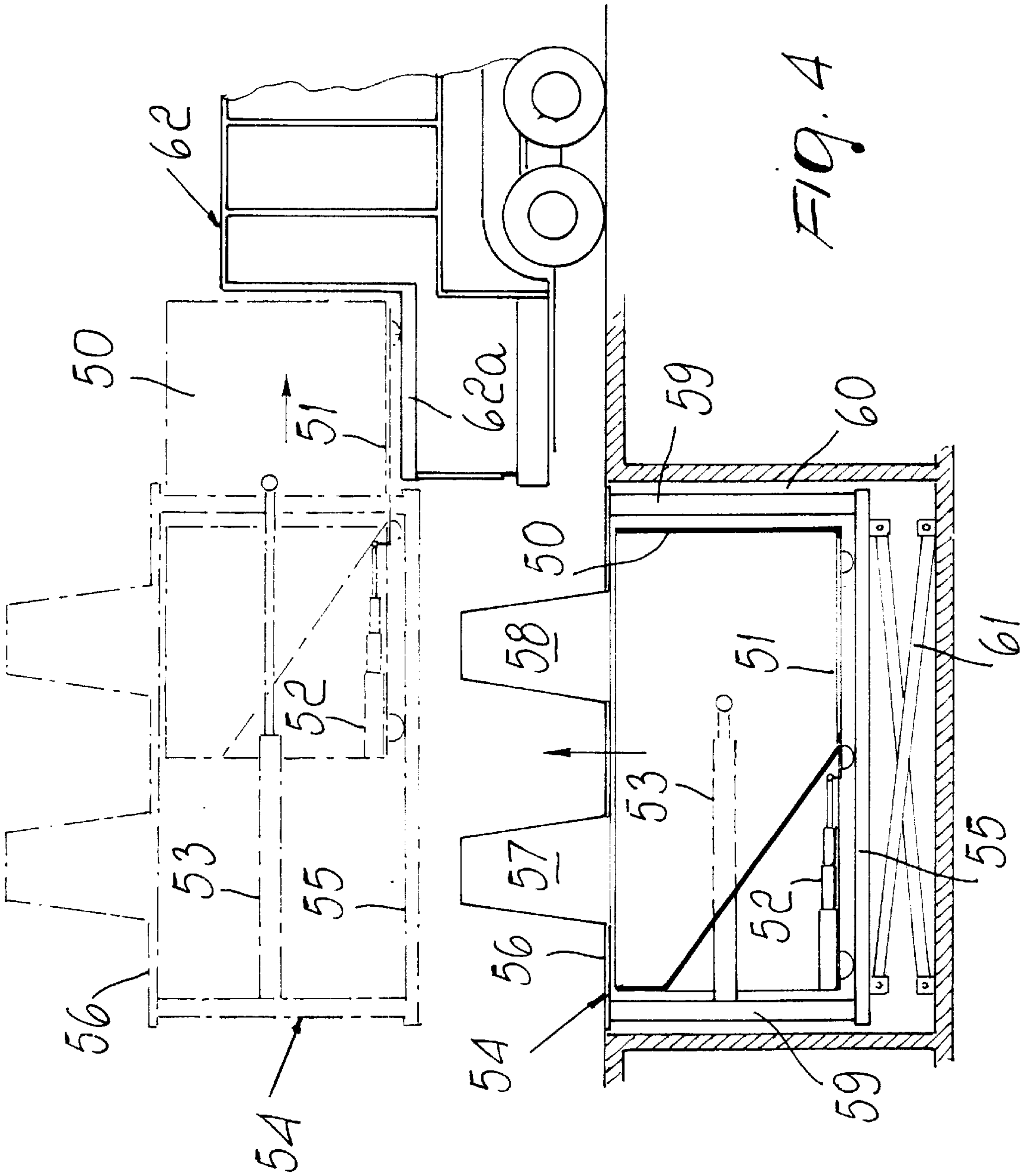
FIG. 4 is a schematic side view of the device of the present invention according to a fourth embodiment.

The fourth embodiment shown in FIG. 4 comprises a waste container 50 with a bottom 51 which can be opened thanks to the action of an hydraulic cylinder 52, slidingly associated through a further hydraulic cylinder 53 with a monolithic structure generally designated by the reference numeral 54, which comprises a platform 55 and a cover 56 provided with waste insertion pillars 57, 58 which are connected by monolithic columns such as 59.

Structure 54 is arranged in a pit 60 and is provided with means comprising a pantograph 61 and being suitable to produce its vertical translatory motion.

By means of the successive action of the pantograph 61 and of the hydraulic cylinder 53, it is possible to move the device from a position in which it is fully inserted in the pit 60, as shown in solid lines in FIG. 4, to a position shown in dot-and-dash lines in the same figure: in this position, the container 50 has been extracted from the structure 54 so that its openable bottom lies above a loading inlet 62*a* of a truck 62 arranged at the rim of the pit 60, so as to allow direct transfer by gravity of the waste from the container 50 to the truck 62 following the opening of the bottom 51 actuated by the cylinder 52.

Nothing changes if the covering 56, instead of being supported by the columns 59, is fixed directly to the container 50.

Figure 5:
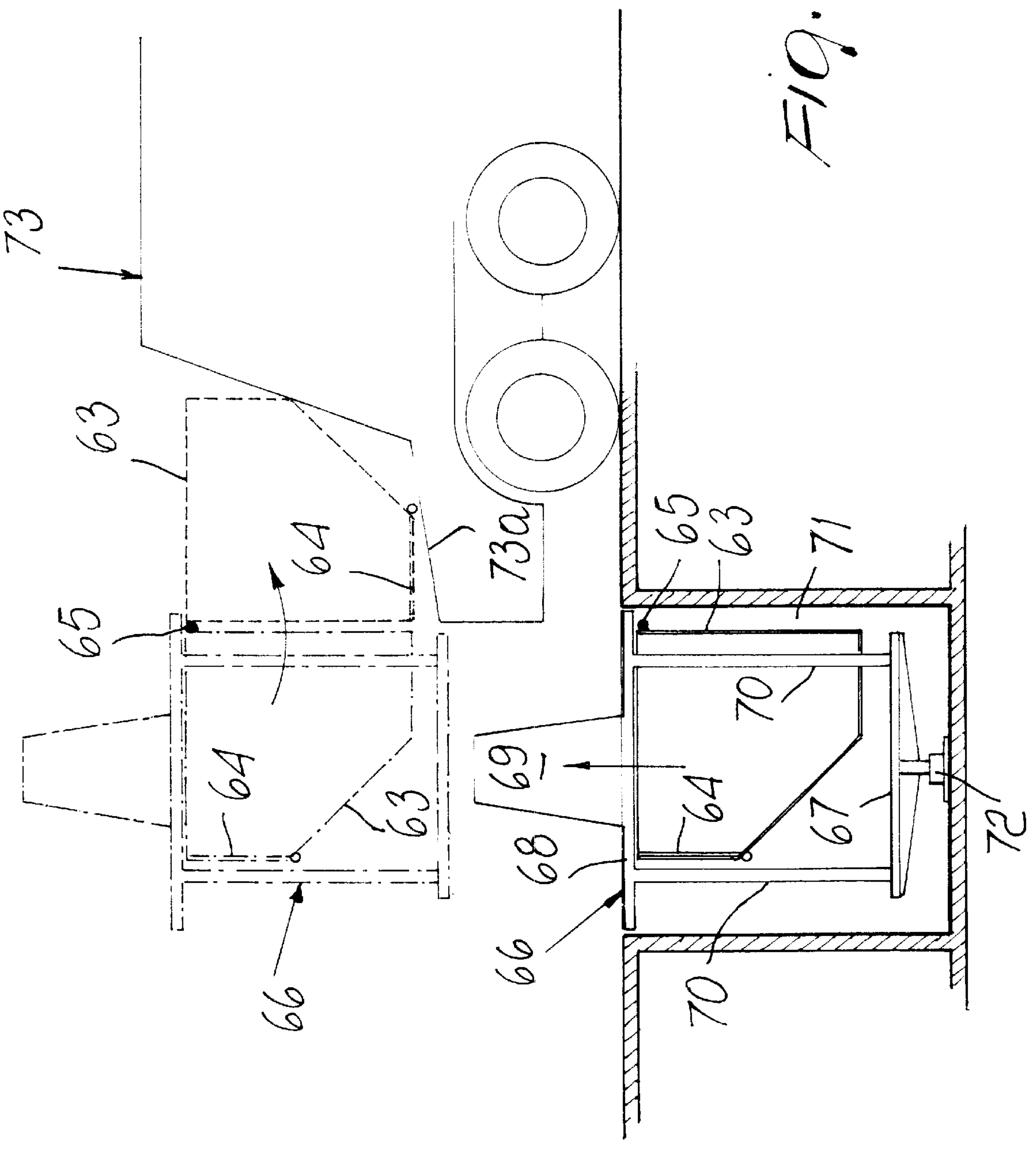
FIG. 5 is a schematic side view of the device of the present invention according to a fifth embodiment.

Container 63 illustrated in the fifth embodiment shown in FIG. 5 is provided with an openable bottom 64 and is associated so that it can rotate about a fulcrum 65 with respect to a monolithic structure 66, which comprises a base 67 and a covering 68, provided with a pillar 69 for waste insertion, which are connected by monolithic posts such as 70; the figure does not show the means suitable to produce the rotation of the container about the fulcrum and the means for opening the bottom 64.

The structure 66 is in a pit 71 and is provided with means which comprise an actuation cylinder 72 and are suitable to produce its vertical translatory motion from a condition shown in solid lines in the figure for complete insertion in the pit 71.

Following the actuation of the actuation cylinder 72, the condition shown in dot-and-dash lines in the figure is -achieved in which the structure 66 is at the upper stroke limit and the container 63 is still contained within the structure. Container 63 is then turned in the direction of the arrow shown in the figure about the fulcrum 65 until it reaches a position shown in dashed lines, in which the bottom 64 lies above a loading inlet 73*a* of a truck 73 arranged at the rim of the pit 71, so as to allow direct transfer of the waste by gravity to the container of the truck.

It is noted that the hydraulic system that comprises all the above-mentioned elements can be provided with an independent control unit but it can also be connected to the control unit located on the vehicle at the rim of the pit.

The above-described invention is susceptible of numerous other modifications and variations, all of which are within the scope of the inventive concept: thus, for example, the pillars for inserting waste in the containers can comprise means for shredding said waste, and means for weighing the containers may also be present.

The disclosures in Italian Patent Application No. MN99A000018 from which this application claims priority are incorporated herein by reference.

What is claimed is:

1. A waste collection device, comprising at least one container which is accommodated in a pit and is arranged under at least one pillar for waste iron, means being provided for empty said container into a vehicle which is arranged at a rim of the pit, wherein shedding means are comprised within the at least one pillar.

2. The device according to claim 1, wherein said at least one container has an openable bottom which is associated with said means for emptying the container, said container being provided with means for moving said container from a position in which it lies within said means for emptying the container to a position in which the openable bottom is located outside the base of said means for emptying the container, said means for emptying the container comprising means for producing a vertical translatory motion of said container between a lower stroke limit, in which a plane that comprises the at least one pillar is located at a level of a paving that surrounds the pit, and an upper stroke limit, in which tee openable bottom of said container is at a level which allows the transfer by gravity of the waste directly into a loading inlet of the vehicle arranged at the rim of the pit.

3. The device according to clam 2, wherein the at least one container is associated with the means for emptying the container so that said container can slide with respect to the base of said means by virtue of actuation means.

4. The device according to claim 1, further comprising a hydraulic system which is suitable to be connected to a control unit which is located on the vehicle arranged at the rim of the pit.

5. A waste collection device, comprising at least one container which is accommodated in a pit and is arranged under at least one pillar for waste insertion, means being provided for emptying said container into a vehicle which is arranged at a rim of the pit, wherein said at least one container has an openable bottom which is associated with said means for emptying the container, said container being provided with means for moving said container from a position in which it lies within said means for emptying the container to a position in which the openable bottom is located outside the base of said means for emptying the container, said means for emptying the container comprising means for producing a vertical translatory motion of said container between a lower stroke limit, in which a plane that comprises the at least one pillar is located at a level of a paving that surrounds the pit, and an upper stroke limit, in which the openable bottom of said container is at a level which allows the transfer by gravity of the waste directly into a loading inlet of be vehicle arranged at the rim of the pit.

6. The device according to claim 5, wherein the at least one container is associated with the means for emptying the container so that said container can slide with respect to the base of said means by virtue of actuation means.

7. The device according to claim 5, further comprising a hydraulic system which is suitable to be connected to a control unit which is located on the vehicle arranged at the rim of the pit.

8. The device according to claim 5, wherein shredding means are comprised within the at least one pillar.

* * * * *